United States Patent [19]

Moore et al.

[11] 4,098,748

[45] Jul. 4, 1978

[54] PLASTICIZED POLYVINYL CHLORIDE RESIN COMPOSITION CONTAINING MOLYBDENUM FLAME RETARDANT AND ANTIMONY COMPOUND SMOKE SUPPRESSANT AGENT

[75] Inventors: Fred W. Moore, Plymouth; George A. Tsigdinos, Ann Arbor, both of Mich.

[73] Assignee: Amax Inc., New York, N.Y.

[21] Appl. No.: 714,383

[22] Filed: Aug. 16, 1976

[51] Int. Cl.$^2$ .......................... C08K 3/20; C08K 5/52; C08K 5/11

[52] U.S. Cl. .......................... 260/30.6 R; 260/318 G

[58] Field of Search .............. 260/31.8 R, 31.8 HA, 260/DIG. 24, 42.49, 31.8 W, 30.6 R, 31.8 G, 31.8 H

[56] References Cited

U.S. PATENT DOCUMENTS

| | | | |
|---|---|---|---|
| 2,888,414 | 5/1969 | Fuller | 260/31.8 W |
| 3,014,000 | 12/1961 | Read | 260/31.8 H |
| 3,121,067 | 2/1964 | Nelson | 260/41 |
| 3,741,893 | 6/1973 | Mascioli | 252/8.1 |
| 3,869,420 | 3/1975 | Mathis et al. | 260/42.49 |
| 3,870,679 | 3/1975 | Mitchell et al. | 260/45.75 N |
| 3,892,667 | 7/1975 | Touval | 260/42.49 |
| 3,900,441 | 8/1975 | King | 260/31.8 HA |

OTHER PUBLICATIONS

Plastics Engineering — SPE, May 1977, vol. XXXIII, No. 5.
Chem. Abstracts - vol. 79, 1973, entry 79811c.

*Primary Examiner*—Joseph L. Schofer
*Assistant Examiner*—Peter F. Kulkosky
*Attorney, Agent, or Firm*—Harness, Dickey & Pierce

[57] ABSTRACT

A flame resistant and smoke suppressed plasticized polyvinyl chloride polymer containing from about 20 to about 100 parts per hundred resin (phr) of a plasticizer comprising an ester-type primary plasticizer in combination with a controlled amount of a chlorinated paraffin or organic phosphate ester secondary plasticizer and an effective amount of a flame retardant and smoke suppressant agent comprising inorganic molybdenum compounds, such as molybdenum oxides and metal molybdates. In accordance with a preferred embodiment, the flame retardant and smoke suppressant agent further includes a controlled effective amount of antimony oxide in combination with the molybdenum compound imparting synergistic flame retardancy and smoke suppressing characteristics to the plasticized polyvinyl chloride resin formulation.

16 Claims, No Drawings

PLASTICIZED POLYVINYL CHLORIDE RESIN COMPOSITION CONTAINING MOLYBDENUM FLAME RETARDANT AND ANTIMONY COMPOUND SMOKE SUPPRESSANT AGENT

BACKGROUND OF THE INVENTION

The excellent mechanical and chemical properties of vinyl chloride homopolymers and copolymers and the versatility of such polymers to compounding variations has resulted in their widespread commercial use for fabricating various structural components, decorative fabrics and films, electrical wiring, floor coverings and the like. The high level of chlorine in vinyl chloride polymers (57%) and vinylidene chloride polymers (73%) renders these resins flame resistant and self-extinguishing in a rigid non-plasticized condition. However, many commercial applications necessitate the inclusion of substantial quantities of plasticizers in such resin formulations to provide the required degree of flexibility consistent with the intended end use. The inclusion of appreciable quantities, such as from about 20 phr up to about 100 phr of ester-type plasticizers, significantly reduces the flame resistant and self-extinguishing characteristics of such vinyl chloride polymers. The inclusion of such flammable ester-type plasticizers is also accompanied by an increased tendency of such plasticized formulations to generate smoke when exposed to elevated pyrolysis temperatures during fires which in many instances create a source of danger to imperilled personnel which is greater than the fire itself. In recognition of the reduced flame retardancy characteristics of such ester-type plasticized vinyl chloride polymers, secondary plasticizers possessing flame retardancy characteristics, such as chlorinated paraffins and organic phosphate esters, have been incorporated as a substitute for a portion of the ester-type plasticizer. While an improvement in the fire retardancy characteristics is usually achieved, the magnitude of flame retardancy attained is inadequate in many instances, and the smoke generation characteristics of such inhibited formulations are still objectionable.

Significant improvements in the flame resistance of such plasticized vinyl chloride polymers have been achieved by incorporating effective amounts of antimony oxide but without any significant reduction in the smoke generation characteristics of such resin compositions. A variety of other organic and inorganic compounds and salts have heretofore been proposed or used to increase the flame retardancy characteristics of such plasticized vinyl chloride polymers or to reduce the smoke generation characteristics thereof, but such agents have been universally deficient in providing an optimum improvement in both of these critical properties. Some of the agents heretofore employed are toxic themselves, or form volatile toxic compounds during combustion, further aggravating the hazard associated during a fire involving articles containing such polymers. The unpredictable behavior of various additive agents on the flame resistance and smoke generation properties of plasticized polyvinyl chloride resins has heretofore resulted in resin formulations possessed of less than optimum flame retardant and smoke suppression properties.

The present invention overcomes many of the problems and disadvantages associated with plasticized vinyl chloride polymers by providing a resin formulation including effective amounts of a material which functions both as a flame retardant agent and a smoke suppressant agent, which is of comparatively low toxicity, which is not itself volatilized when heated to an elevated pyrolysis temperature, but instead remains in the char; which is more economical than many other agents heretofore employed on a cost-effectiveness basis; which is available in good supply from domestic sources; and which is of versatile use in compounding vinyl chloride polymeric compositions.

SUMMARY OF THE INVENTION

The benefits and advantages of the present invention are achieved by providing a flame resistant and smoke suppressed plasticized polyvinyl chloride polymer composition containing from about 20 to about 100 phr of a primary ester-type plasticizer selected from the group comprising phthalates, azelates, adipates, trimellitates, and mixtures thereof, in combination with a secondary plasticizer possessing flame retardancy characteristics selected from the group consisting of chlorinated paraffins and organic phosphate-esters, and from about 1 up to about 8 phr of a flame retardant and smoke suppressant agent comprising a molybdenum compound including oxides of molybdenum and inorganic molybdenum compounds.

In accordance with a further discovery of the present invention, the flame retardant and smoke suppressant agent further includes a controlled amount of an antimony compound present in a ratio of about 0.5 up to about 2 parts per part of the molybdenum compound present, providing for a synergistic flame retardancy and smoke suppressing action, achieving better results in many instances than are attainable by employing equal quantities of either one of the constituents by themselves. The antimony constituent can be in the form of antimony oxide itself ($Sb_2O_3$), as well as compounds containing antimony, such as sodium antimonate ($NaSbO_3$).

It is also contemplated that the molybdenum as well as the antimony constituents of the flame retardant and smoke suppressant agent can be employed in an extended form, such as a coating on a particulated carrier, achieving thereby further effectiveness in the availability of these constituents and a further increase in their cost-effectiveness.

Additional benefits and advantages of the present invention will become apparent upon a reading of the description of the preferred embodiments taken in conjunction with the specific examples provided.

DESCRIPTION OF THE PREFERRED EMBODIMENTS

The composition of the resin formulations and the constituents employed are described in the specification and subjoined claims on a weight basis, unless clearly indicated to the contrary. The term "phr" designates the parts per weight per hundred parts by weight resin.

The term "vinyl chloride polymer", as herein employed, is used in its broad sense and includes polymers of vinyl chloride and vinylidene chloride including homopolymers thereof, copolymers and blends of homopolymers and/or copolymers. The vinyl chloride polymer may contain up to 50% by weight of one other vinylidene monomer copolymerized therewith, while amounts of such vinylidene monomers up to about 20% are more usual. Such vinylidene monomers may include 1-olefins containing from 2 to 12 carbon atoms, and more usually from 2 to 8 carbon atoms, of which ethylene, propylene, 1-butene, isobutylene, 1-hexene, 4-methyl-1-pentene or the like, are typical. The vinylidene monomer may also include dienes having from 4 to 10 carbon atoms including conjugated dienes such as butadiene, isoprene, piperylene and the like; ethylidene norbornene and dicyclopentadiene; vinyl esters and allyl esters including vinyl acetate, vinyl chloroacetate, vinyl propionate, vinyl laurate, allyl acetate or the like; vinyl aromatics such as styrene, alpha-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as alpha-cyanomethyl acrylate, the alpha, beta and gamma-cyanopropyl acrylates and the like; olefinically unsaturated carboxylic acids and esters thereof, olefinically unsaturated acids and esters thereof, such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate and the like, and including esters of maleic and fumaric acid and the like; amides of the alpha, beta-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol and the like; bis(betahaloalkyl) alkenyl phosphonates such as bis(beta-chloroethyl) vinyl phosphonate and the like; etc.

The vinyl chloride polymers are further characterized as being in a plasticized condition as opposed to a nonplasticized rigid condition and for this purpose, encompass vinyl chloride polymers containing from about 20 phr up to about 100 phr of a mixture of primary and secondary plasticizing agents to attain a degree of flexibility ranging from semi-rigid at the lower plasticizer contents to very flexible at the upper plasticizer concentration range. The primary plasticizer is of the ester-type and is selected from the group consisting of phthalates, azelates, adipates, trimellitates, polyesters and mixtures thereof. Typical of the foregoing ester-type primary plasticizers which are in widespread commercial use in compounding plasticized polyvinyl chloride resins are diisodecyl phthalate, ditridecyl phthalate, mixed normal alkyl phthalates, dicyclohexyl phthalate, diundecyl phthalate, butyl benzyl phthalate, and the like; azelate esters including di-2-ethylhexyl azelate, di-n-hexyl azelate, and the like; adipate esters including diisodecyl adipate, dioctyl adipate, and the like; and trimellitate esters including triisooctyl trimellitate, trioctyl trimellitate, and the like; polyesters including polyoxypropylene derivatives of trimethylolpropane and the like.

The foregoing ester-type primary plasticizers are somewhat flammable and their inclusion in such plasticized polyvinyl chloride formulations substantially reduces the flame resistance and self-extinguishing characteristics of the polyvinyl chloride resin itself. For example, an unplasticized homopolymer of polyvinyl chloride in a rigid nonplasticized condition has an oxygen index generally ranging from about 42 to about 49. The incorporation of about 60 phr of dioctyl phthalate (DOP) in such resin reduces the oxygen index to about 22.2; the inclusion of 80 phr of DOP reduces the oxygen index to about 21.1; while the inclusion of about 90 phr of DOP reduces the oxygen index to about 19.2 according to comparative tests conducted. The afore-enumerated oxygen index (OI) values are obtained by subjecting specimens of the resin formulations to ASTM Test Designation D2863-70, entitled "Standard Method of Test for Flammability of Plastics Using the Oxygen Index Method", in which a sample of 1/16 inch thickness is prepared and subjected to a flame in a slowly rising mixture of oxygen and nitrogen. The oxygen index is expressed in terms of volume percent of the minimum oxygen concentration in the oxygen-nitrogen mixture that will just support combustion of the test specimen. It will be apparent from the foregoing that the higher the OI value, the better the flame retardancy characteristics of the resin formulation.

The plasticized polyvinyl chloride formulations of the present invention further include a secondary plasticizer in combination with the primary plasticizer present in amounts ranging from about 15 up to 50% by weight of the total plasticizer present. The secondary plasticizer comprises a compound selected from the group consisting of chlorinated paraffins and organic phosphate-esters of the general types employed in the compounding of vinyl chloride polymers and contribute to secondary plasticizing effects, as well as imparting some flame retardancy characteristics to the resin formulation. The chlorinated paraffin-type secondary plasticizers ordinarily are not employed in amounts in excess of about 30% of the total plasticizer present due to a tendency of such formulations to exude or spew such chlorinated paraffins at the surface. The organic phosphatetype esters can be employed in amounts up to about 50% of the total plasticizer present, although concentrations up to about 30% of the total plasticizer content are more usual.

The halogenated paraffin secondary plasticizer comprises a paraffin oil or wax which has been halogenated to provide a concentration of about 30 up to about 70% halogen. Such halogenated paraffins commercially available for use in formulating polyvinyl chloride resins are principally chlorinated paraffins, although brominated paraffins can also be satisfactorily employed for this purpose. The organic phosphate ester-type secondary plasticizer includes any of those commonly employed in the compounding of polyvinyl chloride polymers including triaryl phosphates, such as triisopropylphenyl phosphate, tricresyl phosphate, cresyl diphenyl phosphate, and the like; alkyl aryl phosphate esters such as isodecyl diphenyl phosphate and the like; trialkyl phosphate esters, such as trioctyl phosphate, tributyl phosphate, and the like; as well as halogenated alkyl phosphate esters such as tris(dichloropropyl) phosphate, tris(chloroethyl) phosphate, tris(dibromopropyl) phosphate, and the like. The incorporation of appreciable quantities of such secondary organic phosphate ester-type plasticizers in polyvinyl chloride formulations, in further combination with conventional ester-type primary plasticizers, have exhibited some interreaction and antagonism toward conventional inorganic type flame retardant agents, such as antimony trioxide, for example. The unpredictable behavior of such composite or mixed plasticizer systems is also reflected in the smoke generation characteristics of polyvinyl chloride polymers when subjected to elevated pyrolysis temperatures such as encountered during combustion.

In addition to the vinyl chloride polymer and mixed plasticizer, the formulations of the present invention may further include conventional fillers or particulated extenders, such as calcium carbonate, talc, silica, alumina trihydrate, and the like, in amounts generally ranging up to about 50 phr; lubricants to facilitate processing of the resin formulation, such as polyethylene, paraffin wax, stearic acid, and the like, in amounts usually up to about 5 phr; heat and ultraviolet stabilizing agents such as tribasic lead sulfate, barium-cadmium-zinc soaps, epoxidized soya oil, organic phosphites, and the like, present in controlled amounts usually up to about 8 phr; as well as various dyes and/or pigment agents to impart the desired color and/or opacity to the resin compositions.

In addition to the foregoing constitutents, the plasticized polyvinyl chloride resin composition of the present invention contains, as a dual functioning flame retardant and smoke suppressant agent, a molybdenum compound present in an effective amount ranging from about 1 up to about 8 phr, and more usually, from about 2 to about 4 phr. The molybdenum compound is introduced in the form of a finely-particulated powder, wherein each particle may consist of the molybdenum agent compound, or in an extended form in which the molybdenum compound is present in the form of a coating on the surfaces of a carrier particle, which may be inert or may also contribute to the flame retardancy characteristics of the resin formulation. Molybdenum compounds suitable for this purpose include molybdenum dioxide ($MoO_2$), molybdenum trioxide ($MoO_3$), as well as molybdate salts including ammonium dimolybdate, or ADM [$(NH_4)_2Mo_2O_7$]; ammonium heptamolybdate, or AHM, [$(NH_4)_6Mo_7O_{24} \cdot 4H_2O$]; ammonium octamolybdate, or AOM, [$(NH_4)_4Mo_8O_{26}$]; ammonium decamolybdate, [$(NH_4)_2Mo_{10}O_{31}$]; sodium molybdate, [$Na_2MoO_4$]; calcium molybdate, [$CaMoO_4$]; zinc molybdate, [$ZnMoO_4$]; and the like. Of the foregoing, molybdenum trioxide itself comprises a preferred material and can be incorporated as a technical grade product corresponding to a material which preferably contains at least about 85% of molybdenum trioxide. The degree of purity of the molybdenum trioxide will vary depending upon its source of manufacture and the degree of purification to which it has been subjected. The degree of purity, however, is not critical since the inactive portion comprised primarily of silica and metal silicates merely serves as an extender filler in the resin formulation. Higher purity molybdenum trioxide materials can also be used, although the higher cost of such purer grades without any significant advantage over technical grade molybdenum oxide normally is not justified from an economic standpoint.

The particle size of the molybdenum compounds is not particularly critical, although it is generally desirable to employ particles of a size and configuration so as to optimize total surface area, rendering the material available for reaction and to also facilitate uniform dispersibility throughout the polyvinyl chloride resin matrix. Commercially available technical grade molybdenum oxide is usually of an average particle size less than about 20 mesh (U.S. Standard Screen Size) and can be satisfactorily employed, although powders of an average particle size less than about 10 microns are usually preferred.

The molybdenum compounds can also be introduced in the form of a coating on a particulated extender material which may itself be possessed of flame retardant characteristics such as hydrated alumina, for example. The use of a particulated extender carrier provides for cost savings over the use of particles comprised entirely of the molybdenum compounds. This is because that usually only the surface of the particle partakes in the flame retardant and smoke suppression reaction during gaseous combustion of the polymer matrix and the reaction seldom progresses to the extent where the entire particle is consumed. By employing such extended molybdenum compounds, a reduction in the total quantity of molybdenum compound required to achieve a desired degree of flame retardancy and smoke suppression is accomplished, or alternatively, the use of such extended molybdenum compounds in amounts equal to non-extended materials on an active ingredient basis provides for greater availability and effectiveness.

The particulated extender material may comprise any one of a variety of substances which are compatible with the molybdenum compounds deposited thereon, as well as with the polyvinyl chloride polymer matrix, including the plasticizing agents employed, and which furthermore do not adversely affect the chemical and physical properties of the polymer and the effectiveness of the flame retardant and smoke suppressant agent incorporated therein. Ordinarily, any one or combinations of two or more of the various extender fillers or pigments normally incorporated in filled polyvinyl chloride polymer systems can be satisfactorily employed which are compatible with the molybdenum compound flame and smoke suppressant agent.

The size and configuration of the extended particles may vary in consideration of the parameters as previously discussed in connection with the non-extended material. Generally, the extender particle is of a configuration which maximizes the surface area of the molybdenum compound coating thereon, and for this purpose, particles of a relatively dense structure are preferred. Porous type particles can also be satisfactorily used, provided that the molybdenum compounds which become impregnated within the interstices of the particles remain available for subsequent reaction. In consideration of the foregoing, the average particle size of the particulated extender may range from as small as about 0.1 microns up to about 25 microns and greater, with sizes ranging from about 0.2 microns to about 10 microns being preferred. The appropriate particle size of the extender material will also vary within the aforementioned ranges in consideration of such additional factors as the amount of molybdenum compound deposited thereon, the types and quantities of other filler materials employed in the polyvinyl chloride polymer matrix, the total concentration of the fire and smoke suppressant molybdenum compound agent used in the formulation, the technique by which the polymer matrix is compounded, as well as the intended end use of the polymer itself.

Typical of the extended filler materials suitable for use for extending the molybdenum compound are low-cost so-called extender-type fillers consisting of finely divided solid powders which are uniformly dispersible throughout the resin mixture and typically include barium sulfates, calcium sulfates including gypsum, terra alba and plaster of Paris; calcium carbonates including whiting and chalk, magnesium carbonate, zinc carbonate, zinc oxide, silicas including quartz and diatomaceous earth, magnesium silicates and related minerals such as talc and soapstone, kaolin clay, mica, pumice, alumina and hydrated aluminas, and the like. Of the foregoing extender filler materials, calcium carbonates, hydrated aluminas, silica and talc constitute particularly satisfactory extenders in view of their low cost, availability and compatability with polyvinyl chloride polymer systems and the molybdenum compounds incorporated therein.

The preparation of the extended form of molybdenum compound can be conveniently achieved employing a variety of techniques such as described in U.S. Pat. Nos. 3,726,694 and 3,874,883, the substance of which is incorporated herein by reference. Briefly stated, a deposition of the desired quantity of the molybdenum compound on the surfaces of the extender particles can be conveniently achieved by slurrying the extender in an aqueous solution containing a dissolved molybdate compound which is concentrated to form a relatively thick slurry or paste, whereafter the mixture is dried and subjected to further comminution to remove any agglomerates that may have formed during the drying phase. Normally, the deposition process is carried out so as to deposit from about 1 to about 20% of the molybdenum compound, calculated as molybdenum, with amounts from about 5 to about 10% being preferred. Quantities in excess of about 20% can also be satisfactorily employed, but are less desirable from an economic standpoint. It will be understood that the extended molybdenum compound can be employed alone or in combination with molybdenum compound particles in a non-extended form to achieve optimum flame retardancy and smoke suppression characteristics on a cost-effectiveness basis.

It has also been discovered that the use of the molybdenum compound in combination with effective controlled amounts of antimony oxide or other antimony compounds, such as sodium antimonate, provide synergistic flame retardancy and smoke suppression characteristics in the plasticized polyvinyl chloride formulations. The use of antimony oxide in combination with the molybdenum compound can be performed to provide a concentration of the antimony oxide constituent in an amount of about 0.5 parts up to about 2 parts for each part of the molybdenum containing agent present. Particularly satisfactory results are achieved when these two constituents are employed in approximately equal amounts and wherein the total quantity of the combined agent is controlled within the range of about 1 up to about 8 phr, and preferably from about 2 up to 4 phr, in the plasticized vinyl chloride polymer formulation. As in the case of the molybdenum compound, the antimony constituent can be employed neat or in an extended form employing extender materials of the same type as previously described. While antimony oxide itself constitutes a preferred material for this purpose, compounds of antimony, such as sodium antimonate or potassium antimonate, can also be employed neat or in an extended form.

In order to further demonstrate the improved flame retardancy and smoke suppressed plasticized vinyl chloride polymers of the present invention, the following examples are provided. It will be understood that the examples are provided for illustrative purposes and are not intended to be limiting of the scope of the invention as herein described and as set forth in the subjoined claims.

EXAMPLE 1

A plasticized polyvinyl chloride resin formulation is prepared employing a vinyl chloride polymer with an inherent viscosity of 1.13 (ASTM D-1243-66), commercially available under the designation Geon 102 EP F5 from B. F. Goodrich, incorporating 38 phr dioctyl phthalate, 14 phr of a chlorinated paraffin commercially available under the designation Chlorowax 500C, from Diamond Shamrock Company; 35 phr calcium carbonate, 5 phr of an epoxidized soya oil, 1 phr of a barium-cadmium-zinc soap base stabilizer, and varying amounts and combinations of the flame and smoke suppressant agent of the present invention. The chlorinated paraffin secondary plasticizer contains about 59% chlorine, has a viscosity of 20 poises at 25° C and a specific gravity of 1.36 at 25° C. The calcium carbonate filler is of a pigment grade having a particle size of about 2 microns. The epoxidized soya oil serves the dual function as a heat stabilizing agent, as well as a secondary plasticizing agent, and is available commercially under the designation Drapex 6.8 from Argus Chemical Company. The barium-cadmium-zinc heat stabilizer is commercially available under the designation Mark 1432 from Argus Chemical Company.

The foregoing constituents are compounded into a plasticized vinyl chloride polymer employing conventional compounding techniques, to aliquot portions of which controlled amounts of flame and smoke suppressant agents are added as set forth in Table 1.

Table 1

| Sample | Flame Retardant Agent | Oxygen Index | Smoke Formation Data | |
|---|---|---|---|---|
| | | | Smoke Generation | Percent Reduction* |
| A | None | 25.0 | 13.3 | — |
| B | 3 phr $Sb_2O_3$ | 29.0 | 11.1 | 17 |
| C | 3 phr $MoO_3$ | 27.5 | 5.4 | 59 |
| D | 5 phr $MoO_3$ | 28.5 | 4.7 | 65 |
| E | 1.5 phr $Sb_2O_3$ plus 1.5 phr $MoO_3$ | 31.0 | 6.6 | 50 |
| F | 3 phr ammonium octamolybdate | 29.0 | 4.7 | 65 |
| G | 1.5 phr $Sb_2O_3$ plus 1.5 phr ammonium octamolybdate | 31.0 | 6.4 | 52 |

*Reduction compared to control.

As shown, sample A is devoid of any flame retardant agent, sample B contains 3 phr of antimony oxide, sample C contains 3 phr of molybdenum trioxide, sample D contains 5 phr of molybdenum trioxide, sample E contains equal amounts of antimony oxide and molybdenum oxide, sample F contains 3 phr of ammonium octamolybdate, while sample G contains equal amounts of antimony oxide and ammonium octamolybdate. In accordance with the foregoing arrangement, sample A served as a control for comparative purposes with respect to both flammability and smoke generation properties of the various test specimens.

The roll blended vinyl chloride formulations are molded into test specimens employing frame molds at a temperature of 350° F under a pressure of about 50,000 psi. The test specimens are 0.075 inch thick and are subjected to an evaluation of their flame retardancy properties employing the oxygen index method as previously described, as well as their smoke generation properties using a smoke densitometer instrument, designated as Model No. 95-001-03, which is available from Michigan Chemical Corporation. The unit of measurement used to describe smoke density or smoke generated when measured by this instrument is computed as the total light obscuration (the area under a percent light attenuation vs. time curve) per gram of sample of fixed size, 10 × 10 × 3 mm. The values enumerated under the heading "Smoke Generation" in Table 1 comprise the results of 100 minus the percent transmittence of light integrated over the duration of burning in minutes per gram of sample, while the data under the heading "Percent Reduction" reflects the percentage reduction in smoke generation compared to the control sample A.

It is apparent from the data as set forth in Table 1 that the inclusion of 3 and 5 phr of molybdenum trioxide provides for a significant improvement in the flame resistance of the plasticized vinyl chloride resin, as well as a significant reduction in the quantity of smoke generated in comparison to the noninhibited sample A. The use of antimony oxide by itself, as exemplified by sample B, provides for an improvement in flame resistance, but only a negligible reduction in smoke generation. The synergistic effect of employing antimony oxide and a molybdenum compound in combination is exemplified by samples E and G, in which a substantial improvement in flame resistance is achieved as measured by the oxygen index of the test samples, while at the same time reducing smoke generation by 50% or more.

EXAMPLE 2

A plasticized vinyl chloride polymer formulation was prepared in the same manner as previously described in Example 1 but utilizing a different chlorinated paraffin commercially available under the designation Cerechlor 52 available from ICI United States Inc. The chlorinated paraffin secondary plasticizer has a chlorine content ranging from 50 to 52%, is of a density of from 1.23 to 1.26 at 25° C and has a viscosity of 900 to 1900 centipoises at 25° C. Four test samples are prepared employing the same technique as previously described in Example 1 which are designated as samples H through K. Sample H represents a control sample devoid of any flame retardant and smoke suppressant agents, while samples I, J and K contain the agents as set out in Table 2.

The dual functionality of molybdenum trioxide as a flame retardant and smoke suppressant agent in plasticized vinyl chloride polymers incorporating chlorinated paraffin secondary plasticizers is clearly evidenced by the oxygen index and smoke formation data obtained on sample J incorporating 3 phr molybdenum trioxide. The synergistic effect of combining antimony oxide and molybdenum trioxide is again evidenced by the results obtained on sample K, as set out in Table 2.

Table 2

| Sample | Flame Retardant Agent | Oxygen Index | Smoke Formation Data | |
|---|---|---|---|---|
| | | | Smoke Generation | Percent Reduction |
| H | None | 24.5 | 9.0 | — |
| I | 3 phr Sb$_2$O$_3$ | 29.0 | 7.3 | 19 |
| J | 3 phr MoO$_3$ | 27.5 | 4.3 | 52 |
| K | 1.5 phr Sb$_2$O$_3$ plus 1.5 phr MoO$_3$ | 29.5 | 4.7 | 48 |

EXAMPLE 3

A plasticized vinyl chloride polymer formulation is prepared employing the same constituents as described in Example 1 but including 30 phr of dioctylphthalate as the primary plasticizer, and 15 phr tricresyl phosphate as a secondary organic phosphate ester-type secondary plasticizer in lieu of the chlorinated paraffin secondary plasticizers used in Examples 1 and 2. The formulations are prepared in the usual manner and test specimens samples L through R, as set forth in Table 3, are prepared and subjected to flammability and smoke generation properties relative to control sample L devoid of any flame retardant and smoke suppressant additives other than the phosphate ester plasticizer itself.

Table 3

| Sample | Flame Retardant Agent | Oxygen Index | Smoke Formation Data | |
|---|---|---|---|---|
| | | | Smoke Generation | Percent Reduction |
| L | None | 27.0 | 11.5 | — |
| M | 3 phr Sb$_2$O$_3$ | 29.5 | 9.0 | 22 |
| N | 3 phr MoO$_3$ | 29.5 | 7.8 | 32 |
| O | 1.5 phr Sb$_2$O$_3$ plus 1.5 phr MoO$_3$ | 31.0 | 3.2 | 72 |
| P | 2 phr ammonium octamolybdate | 30.5 | 5.8 | 50 |
| Q | 3 phr ammonium octamolybdate | 31.5 | 5.8 | 50 |
| R | 1.5 phr Sb$_2$O$_3$ plus 1.5 phr ammonium octamolybdate | 30.5 | 3.5 | 70 |

The improvement in the flame resistance and the reduction in smoke generation of the plasticized vinyl chloride polymers incorporating molybdenum compounds are clearly evidenced by the data as set forth in Table 3. The use of 3 phr molybdenum trioxide in sample N imparts flame resistance substantially equal to that of equivalent amount of antimony oxide typified by sample M. However, the molybdenum containing sample N had better smoke suppression properties than the antimony oxide containing specimen. Sample O again emphasizes the synergistic flame retardancy and smoke suppression characteristics provided by employing a combination of the molybdenum compound and antimony oxide constituents. Sample Q, containing 3 phr ammonium octamolybdate, provided the highest flame retardancy, while at the same time providing for about 50% reduction in smoke generation in comparison to the control sample L.

EXAMPLE 4

A series of test specimens are prepared in the same manner as described in connection with Example 3, but employing triisopropylphenyl phosphate, commercially designated as Kronitex 100 from FMC Corporation, as a secondary plasticizer in lieu of the tricresyl phosphate secondary plasticizer employed in Example 3. As set forth in Table 4, sample S comprised the control, while samples T through W contained controlled amounts of antimony and molybdenum compound agents. In samples X, Y and Z, the original 35 phr of calcium carbonate were replaced with a corresponding number of parts of an alumina trihydrate filler commercially available under the designation Hydral 710, available from Aluminum Company of America.

Table 4

| Sample | Flame Retardant Agent | Oxygen Index | Smoke Formation Data | |
|---|---|---|---|---|
| | | | Smoke Generation | Percent Reduction |
| S | None | 26.5 | 12.6 | — |
| T | 3 phr Sb$_2$O$_3$ | 28.0 | 9.1 | 28 |
| U | 3 phr MoO$_3$ | 29.0 | 2.9 | 77 |
| V | 1 phr Sb$_2$O$_3$ plus 1 phr MoO$_3$ | 29.5 | 4.7 | 63 |
| W | 1.5 phr Sb$_2$O$_3$ plus 1.5 phr MoO$_3$ | 29.5 | 3.4 | 73 |
| X | 35 phr Hydral 710 | 27.5 | 4.6 | 64 |
| Y | 35 phr Hydral 710 plus 3 phr MoO$_3$ | 31.5 | 2.6 | 79 |
| Z | 35 phr Hydral 710 plus 1.5 phr Sb$_2$O$_3$ plus 1.5 phr MoO$_3$ | 32.0 | 3.6 | 71 |

A comparison of the results obtained on samples T and U clearly evidence the superiority of molybdenum trioxide over antimony trioxide as a flame retardant and smoke suppressant agent in plasticized vinyl chloride polymers incorporating organic phosphate ester secondary plasticizers. The synergistic effect achieved by employing a combination of these two constituents is again evidenced by the results obtained on samples W and Z.

EXAMPLE 5

A series of test specimens were prepared in accordance with the procedure as previously described in Example 3, but employing still another organic phosphate ester; namely, isodecyldiphenyl phosphate, commercially available under the designation Santicizer 148, available from Monsanto Company. The results of flammability and smoke formation tests are set forth in Table 5.

Table 5

| Sample | Flame Retardant Agent | Oxygen Index | Smoke Formation Data | |
|---|---|---|---|---|
| | | | Smoke Generation | Percent Reduction |
| AA | None | 24.5 | 14.7 | — |
| AB | 3 phr Sb$_2$O$_3$ | 27.5 | 8.3 | 43.5 |
| AC | 3 phr MoO$_3$ | 28.0 | 3.5 | 76.2 |
| AD | 1.5 phr Sb$_2$O$_3$ plus 1.5 phr MoO$_3$ | 29.0 | 7.6 | 48.3 |

The results obtained on sample AC substantiates the surprising superiority of molybdenum trioxide as both a flame retardant and smoke suppressant agent over antimony oxide in the same plasticized vinyl chloride polymers. The results obtained on sample AD again evidence the synergistic effect on flame retardancy achieved by employing both molybdenum trioxide and antimony oxide in equal amounts, while simultaneously achieving a reduction in smoke generation of about 50%.

EXAMPLE 6

Another series of plasticized vinyl chloride polymers is prepared employing still another secondary organic phosphate ester plasticizer; namely, tris(dichloropropyl) phosphate, which is commercially available under the designation FYROL FR-2 from Stauffer Chemical Company, and comprises a chlorinated organic phosphate containing 7.2% phosphorus and 49.1% chlorine. The flammability and smoke suppression characteristics of the test formulation samples AE, AF, AG and AH are set forth in Table 6.

Table 6

| Sample | Flame Retardant Agent | Oxygen Index | Smoke Formation Data | |
|---|---|---|---|---|
| | | | Smoke Generation | Percent Reduction |
| AE | None | 28.0 | 6.0 | — |
| AF | 3 phr Sb$_2$O$_3$ | 30.5 | 6.2 | (3)* |
| AG | 3 phr MoO$_3$ | 32.0 | 2.8 | 53 |
| AH | 1.5 phr Sb$_2$O$_3$ plus 1.5 phr MoO$_3$ | 33.0 | 3.3 | 45 |

*Increase in smoke compared to control.

While it will be apparent that the invention as herein described is well calculated to achieve the benefits and advantages as hereinabove set forth, it will be appreciated that the invention is susceptible to modification, variation and change without departing from the spirit thereof.

What is claimed is:

1. A flame resistant and smoke suppressed plasticized polyvinyl chloride polymer composition consisting essentially of a polyvinyl chloride polymer, from about 20 phr to about 100 phr of a plasticizing agent comprising a mixture of a primary ester-type plasticizer and a secondary plasticizer selected from the group consisting of halogenated paraffins and organic phosphate esters, said secondary plasticizer present in an amount of from about 15 to about 50% of the total plasticizing agent present, and a flame retardant and smoke suppressant agent comprising a mixture of a molybdenum compound selected from the group consisting of molybdenum oxide and molybdate salts and an antimony compound selected from the group consisting of antimony oxide, sodium antimonate and potassium antimonate present in an amount of from about 1 phr up to about 8 phr, said antimony compound present in an amount of from 0.5 parts up to 2 parts per part molybdenum compound present.

2. The polymer composition as defined in claim 1, wherein said secondary plasticizer comprises a chlorinated paraffin present in an amount up to 30% by weight of the total plasticizing agent present.

3. The polymer composition as defined in claim 1, wherein said secondary plasticizer comprises a chlorinated paraffin containing from about 30 up to 70% by weight chlorine and present in an amount of from about 15 up to 30% by weight of the total plasticizing agent present.

4. The polymer composition as defined in claim 1, wherein said secondary plasticizer comprises organic phosphate esters present in an amount up to 50% by weight of the total plasticizing agent present.

5. The polymer composition as defined in claim 1, wherein said flame retardant and smoke suppressant agent is present in an amount of about 2 phr to about 4 phr.

6. The polymer composition as defined in claim 1, wherein said flame retardant and smoke suppressant agent is present in the form of particles of an average size less than about 20 mesh which are distributed substantially uniformly throughout said polymer composition.

7. The polymer composition as defined in claim 1, wherein said flame retardant and smoke suppressant agent is present in the form of particles of an average particle size less than about 10 microns which are distributed substantially uniformly throughout said polymer composition.

8. The polymer composition as defined in claim 1, wherein said molybdenum compound comprises molybdenum trioxide.

9. The polymer composition as defined in claim 1, wherein said molybdenum compound comprises molybdenum dioxide.

10. The polymer composition as defined in claim 1, wherein said molybdenum compound comprises an ammonium molybdate salt.

11. The polymer composition as defined in claim 1, wherein said molybdenum compound comprises a calcium molybdate salt.

12. The polymer composition as defined in claim 1, wherein said molybdenum compound comprises a sodium molybdate salt.

13. The polymer composition as defined in claim 1, wherein said molybdenum compound comprises a zinc molybdate salt.

14. The polymer composition as defined in claim 1, wherein at least a portion of said molybdenum compound is present in the form of a coating on the surfaces of an extender filler.

15. The polymer composition as defined in claim 14, in which the coated said extender filler contains from about 1 to about 20% by weight of said molybdenum compound.

16. The polymer composition as defined in claim 1, wherein at least a portion of said antimony compound is present in the form of a coating on the surfaces of an extender filler.

* * * * *